(12) United States Patent
Taylor et al.

(10) Patent No.: US 11,995,866 B2
(45) Date of Patent: May 28, 2024

(54) OPTICALLY READABLE MARKERS

(71) Applicant: Zappar Limited, Auchterarder (GB)

(72) Inventors: Simon John Taylor, London (GB); Jordan Evan Campbell, London (GB)

(73) Assignee: Zappar Limited, Auchterarder (GB)

( * ) Notice: Subject to any disclaimer, the term of this patent is extended or adjusted under 35 U.S.C. 154(b) by 0 days.

(21) Appl. No.: 18/245,769

(22) PCT Filed: Sep. 9, 2021

(86) PCT No.: PCT/GB2021/052336
§ 371 (c)(1),
(2) Date: Mar. 17, 2023

(87) PCT Pub. No.: WO2022/058715
PCT Pub. Date: Mar. 24, 2022

(65) Prior Publication Data
US 2023/0394704 A1    Dec. 7, 2023

(30) Foreign Application Priority Data

Sep. 18, 2020    (GB) ...................................... 2014750

(51) Int. Cl.
*G06T 7/73*    (2017.01)
*G06K 7/14*    (2006.01)
*G06T 7/60*    (2017.01)

(52) U.S. Cl.
CPC .............. *G06T 7/74* (2017.01); *G06K 7/1426* (2013.01); *G06T 7/60* (2013.01); *G06T 2207/30204* (2013.01)

(58) Field of Classification Search
CPC ............ G06T 7/74; G06T 7/60; G06K 7/1426

USPC ...................................................... 235/462.03
See application file for complete search history.

(56) References Cited

U.S. PATENT DOCUMENTS

| | | | |
|---|---|---|---|
| 2006/0274952 A1* | 12/2006 | Nakai | G06K 7/1095 |
| | | | 382/274 |
| 2009/0302114 A1* | 12/2009 | Ao | G06K 19/06037 |
| | | | 235/494 |
| 2010/0104135 A1 | 4/2010 | Nakajima | |
| 2011/0065496 A1 | 3/2011 | Gagner et al. | |
| 2012/0194671 A1* | 8/2012 | Meiring | G06K 7/1456 |
| | | | 348/137 |

(Continued)

FOREIGN PATENT DOCUMENTS

| | | |
|---|---|---|
| EP | 2509028 A1 | 10/2012 |
| GB | 2566365 A | 3/2019 |

OTHER PUBLICATIONS

The Written Opinion of the International Searching Authority for International Application No. PCT/GB2021/052336.

(Continued)

*Primary Examiner* — Ahshik Kim
(74) *Attorney, Agent, or Firm* — Renner, Kenner, Greive, Bobak, Taylor & Weber

(57) ABSTRACT

An optically readable marker comprises a dash and two dots arranged in a pattern to allow detection of the marker, wherein the dash and dots are collinear, and wherein the dots are of the same size and shape and adjacent to each other. Multiple such optically readable markers may be combined into a composite marker, optionally with one element (i.e. a dash or a dot of the marker) being at least partially shared between two or more markers.

20 Claims, 8 Drawing Sheets

(56) References Cited

U.S. PATENT DOCUMENTS

2015/0228123 A1    8/2015   Yasutake

OTHER PUBLICATIONS

The GB Search Report under Section 17 for related Appliocation No. GB2014750.0.

* cited by examiner

OPTICALLY READABLE MARKERS

TECHNICAL FIELD

The invention relates to optically readable markers, and in particular to fiducial markers, and to methods of marking objects or images with one or more such markers such that a position of the marker, and optionally thereby of the marked object or image, can be determined and/or a position of data to be extracted can be determined. The markers may be of particular utility in Augmented Reality (AR) or Virtual Reality (VR) systems. In particular, but not exclusively, markers may have data identifying the marked entity associated therewith, such that the marker may allow the position of the marked object and of the data to be determined, and reading the identified data may then provide the identity of the object or image, and/or other information about the object or image.

BACKGROUND

Various styles of fiducial markers are known in the art—issues with current markers include relatively large space requirements, problems with occlusion, confusion with background elements or characters, and/or relatively slow identification, amongst others. Embodiments of the present invention may address one or more of these issues.

SUMMARY

According to a first aspect of the invention, there is provided a system comprising:
  an optically readable marker comprising a dash and two dots arranged in a pattern to allow detection of the marker, wherein the dash and dots are collinear, and wherein the dots are of the same size and shape and adjacent to each other; and
  a processing unit arranged to:
    obtain marker reference data for the marker, the marker reference data providing data relating to a template of the marker;
    obtain a two-dimensional image showing the marker;
    identify the marker in the two-dimensional image from the relative sizes and spacings of detected elements of the marker, the elements of the marker being the dash and the dots; and
    determine the position of the marker by determining correspondences between the detected elements and the template and computing an image transformation to align the detected elements with the template.

The optically readable marker may be located on, and used to mark, a physical object.

The optically readable marker may be as described with respect to the second aspect below, and the determination may be performed accordingly. Any features described with respect to the second aspect may therefore equivalently be applied to the first.

According to a second aspect of the invention, there is provided an optically readable marker comprising a dash and two dots arranged in a pattern to allow detection of the marker, wherein the dash and dots are collinear, and wherein the dots are of the same size and shape and adjacent to each other.

The marker is described as "optically-readable" as it is arranged to be read, in any suitable way, by a processing unit—for example, it may be imaged and the image then read by a processing unit (e.g. taking a photograph with a camera and transmitting that to another device or software module for processing), or may be directly read (e.g. scanned and interpreted using a scanner, optionally a scanner function of a camera).

As used herein, the term "processing unit" is used to indicate any entity, physical or virtual, arranged to perform computational processing—for example one or more processor(s) or other processing circuitry may be employed, and the processing may be performed locally (e.g. by a user's smartphone or other device), at a specific remote server, "in the cloud", or in any suitable way.

A distance between the dots of the marker may be arranged to provide an indication of at least one of the location and length of the dash of the marker. Relative sizes and spacings of the dash and two dots of the marker may be arranged to allow the marker to be identified so that a position of the marker can then be determined by image transformation.

The optically-readable marker may be a fiducial marker.

A distance between the dots of the marker may be arranged to provide an indication of the location and/or length of the dash of the marker. A size of the dots of the marker may be arranged to provide an indication of the location and/or length of the dash of the marker.

The dots may be circular.

The dash may be rectangular.

The shorter dimension of the dash may be equal to the dimension (e.g. diameter, for circular dots) of the dots. The longer dimension of the dash may be equal to twice the dimension of the dots.

The optically readable marker may form part of a composite marker. The composite marker may comprise two or more optically readable markers in known relative positions.

The composite marker may comprise two, non-parallel and non-collinear, optically readable markers sharing a dot or a dash. Alternatively, the composite marker may comprise two or more non-collinear markers arranged in known relative positions, and not sharing a dot. The non-collinearity may improve ease of determination of a full image transformation from the composite marker.

Alternatively or additionally, the composite marker may comprise two or more collinear markers. The presence of multiple collinear markers may improve robustness to occlusion.

The marker may comprise optically-extractable data. The optically-extractable data may be located within one or more data regions associated with the pattern of two dots and a dash, the one or more data regions each having a known size and position with respect to the pattern. In embodiments with composite markers, the data regions may be in set locations relative to the overall composite marker.

According to a third aspect, there is provided an entity marked with an optically readable marker, the optically readable marker comprising:
  a dash and two dots, wherein the dash and dots are collinear, and wherein the dots are of the same size and shape and adjacent to each other,
and wherein the dash and two dots of the optically readable marker are arranged to allow the position of the marked entity to be determined.

Position may comprise location and orientation; it will be appreciated that a determined orientation may be non-unique in some embodiments.

The entity may be marked with multiple such markers, optionally forming a composite marker.

The optically readable marker may be as described with respect to the second aspect.

The entity may be a physical object.

The pattern of two dots and a dash may be the only mark provided for detection of the presence of the marker in some embodiments. A composite marker comprising multiple patterns of two dots and a dash may be the only mark provided for detection of the presence of the marker in some embodiments.

The entity may be marked with multiple optically readable markers each comprising a set of two dots and a dash. Optionally, the dots and dashes may be the only marks provided for detection of the presence of the markers.

The entity may be marked with a composite marker comprising two or more optically readable markers in known relative positions.

The entity may be marked with a composite marker comprising two such optically readable markers arranged at an angle to each other. A dot or a dash of the marker(s) may be shared between the two optically readable markers.

The entity may have a face with two or more corners, and a composite marker may be arranged by at least one corner of the entity, for example with either:
 (i) a shared dot nearest the corner, and the markers extending away from the shared dot along a respective edge of the face; or
 (ii) a shared L-shape nearest the corner providing the dash of each marker, and the markers extending away from the shared L-shape along a respective edge of the face.

The entity may be marked with a composite marker comprising two such optically readable markers arranged at an angle to each other, and wherein a dot of the two dots is shared between the two optically readable markers. The entity may have a face with two or more corners, and a composite marker may be arranged by each corner, for example with the shared dot nearest the corner and the markers extending away from the shared dot along a respective edge of the face.

The entity may be a three-dimensional object. Multiple markers may be positioned around a perimeter of the object so as to allow detection of one or more of the markers from a variety of angles.

The object may be at least substantially cylindrical, and a row of parallel, non-collinear, markers may be provided around a circumference of the object. This may allow the composite marker formed by the row of parallel, non-collinear, markers to be identified even when a large portion of the composite marker (e.g. all of one or more sides of the object) is occluded.

The marked entity may be a controller for a virtual reality or augmented reality application.

The marked entity may be a location marker, or world marker, for a virtual reality or augmented reality application.

According to a fourth aspect, there is provided the use of a marker as described with respect to the second aspect for augmented reality applications.

According to a fifth aspect, there is provided the use of a marked entity described with respect to the third aspect for augmented reality applications.

In particular, the fourth and fifth aspects may comprise use of an optically-readable marker comprising a dash and two dots arranged in a pattern to allow detection of the marker, wherein the dash and dots are collinear, and wherein the dots are of the same size and shape and adjacent to each other, or of an entity marked with such a marker, for augmented reality applications, wherein the relative sizes and spacings of the dash and two dots are used to identify the optically readable marker so that a position of the marker can then be determined by image transformation.

According to a sixth aspect, there is provided a method for identifying the presence of an optically-readable marker, the method comprising:
 obtaining marker reference data, the marker reference data providing data relating to a template for an optically readable marker comprising a dash and two dots, wherein the dash and dots are collinear, and wherein the dots are of the same size and shape and adjacent to each other;
 in an image, identifying a pattern, the pattern comprising at least three elements;
 verifying that the relative sizes and spacings of the elements of the pattern correspond to an optically readable marker defined in the marker reference data so as to identify the pattern as forming an optically readable marker.

The method may include identifying a position of an optically-readable marker, as well as its presence. The verifying step may be or comprise verifying that the relative sizes and spacings of the elements of the pattern correspond to an optically readable marker defined in the marker reference data, based on the relative sizes and spacings of elements of the marker, the elements of the marker being the dash and the dots, so as to identify the pattern as forming an optically readable marker. The method may further comprise determining the position of the marker by determining correspondences between the detected elements and the template and computing an image transformation to align the detected elements with the template.

The method may be performed at a processing unit.

The marker may be as described in the second aspect.

The marker may be part of a composite marker comprising multiple patterns of a dash and two dots, in known relative positions. The individual markers of the composite marker may be non-collinear.

The method may further comprise identifying the location and orientation of an entity marked with the marker. The marker reference data may comprise information on the position of the marker on the entity and the image may include an image of at least a part of the entity including the marker. The method may further comprise determining the location and orientation of the entity based on the identified optically readable marker and any transformations performed to map the image of the marker to the marker template as defined in the marker reference data.

The method may further comprise acquiring a two-dimensional image including the marker. The acquiring the image may comprise taking a photograph or using a live frame of a camera.

The orientation of the entity may be uniquely determined using the identified optically readable marker(s); optionally using a composite marker.

The entity may be marked with a plurality of markers. The method may further comprise identifying patterns marked on the entity corresponding to two or more of the plurality of markers, and determining the location and orientation of the entity based on the plurality of identified optically readable markers.

The identifying a pattern within the image may comprise:
 detecting dots within the image;
 identifying a first pair of dots which have no other mark therebetween;
 determining one or more expected positions of a dash based on the pair of dots; and
 searching for the dash in the one or more expected positions.

The determining one or more expected positions of the dash may comprise looking for a dash adjacent to one of the dots and collinear with the pair of dots, within an expected distance range of the dots, the distance being determined relative to the size and/or spacing of the dots.

According to a seventh aspect, there is provided a method of extracting data from an image, the method comprising:

obtaining marker reference data, the marker reference data providing data relating to a template of an optically readable marker comprising a dash and two dots and the location and orientation of one or more data regions relative to the marker, wherein the dash and dots are collinear, and wherein the dots are of the same size and shape and adjacent to each other;

in the image, identifying a pattern, the pattern comprising at least three elements;

verifying that the relative sizes and spacings of the elements of the pattern correspond to an optically readable marker defined in the marker reference data so as to identify the pattern as forming an optically readable marker;

determining the location and orientation of the one or more data regions based on the identified optically readable marker; and extracting data from the one or more data regions.

The marker may be as described for the second aspect.

The verifying step may be or comprise verifying that the relative sizes and spacings of the elements of the pattern correspond to an optically readable marker defined in the marker reference data, based on the relative sizes and spacings of elements of the marker, the elements of the marker being the dash and the dots, so as to identify the pattern as forming an optically readable marker. The method may further comprise determining the location and orientation of the one or more data regions based on the identified optically readable marker and an image transformation between the template and the identified optically readable marker. The data may then be extracted from the one or more data regions for which locations and orientations have been determined.

The marker may be marked on an entity, and the data may include information on an identity of the marked entity. The marker may be as described in the second aspect.

A plurality of data regions may be defined in the marker reference data, and optically scanned so as to extract the encoded data.

The extracting data from the one or more data regions may comprise optically scanning the one or more data regions so as to extract the data encoded therein.

Markers of the invention may address one or more of the following issues of prior art fiducial markers. They may:

1) Permit use of a rapid algorithm for detection so that detection can be practically implemented on currently available hardware;
2) Have unique features when compared to general image background, so that detections of the pattern of the marker are highly likely to be from true areas of interest rather than background;
3) Enable the image transformation to be determined (scale, orientation, viewing angle) so that both location and orientation of the marked object or image can be determined; and
4) Maintain a small area overhead for the marker, so it can be used in use-cases where the available space is limited, and/or successfully read from an image of a relatively small region of a marked entity.

The invention relates to a means for identifying a particular region of a 2D image containing data to be extracted. Embodiments of the invention may be well-suited for implementation on resource-constrained mobile devices such as smartphones. Embodiments of the invention may feature a very low area overhead, making the invention suitable for use in circumstances where the area available for marking the data is limited.

The skilled person would understand that features described with respect to one aspect of the invention may be applied, mutatis mutandis, to any other aspect of the invention.

BRIEF DESCRIPTION OF THE DRAWINGS

There now follows by way of example only a detailed description of embodiments of the present invention with reference to the accompanying drawings in which.

In the figures, like or corresponding reference numerals are used for like or corresponding features.

DETAILED DESCRIPTION

Figure 1:
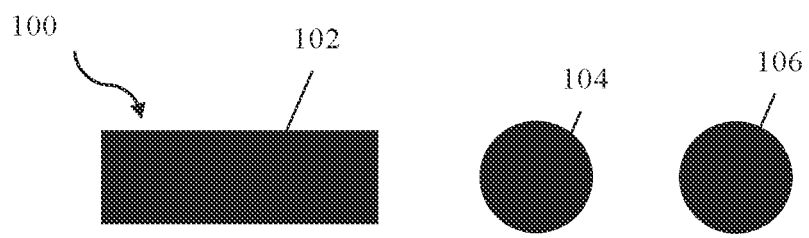
FIG. 1 shows a marker of an embodiment.

FIG. 1 illustrates a marker 100 of an embodiment. The marker 100 is arranged to be optically detectable and identifiable as a marker.

The marker 100 comprises three components 102, 104, 106. The three components 102, 104, 106 are arranged in a pattern. The pattern is arranged to be optically detectable, such that the combination of three components 102, 104, 106 can be used to identify the presence of the marker 100. The combination of three components 102, 104, 106 may also be used to identify the location and/or orientation of the marker 100. In some embodiments, the marker 100 may consist of only these three elements 102, 104, 106. In alternative embodiments, one or more additional elements may be present, e.g. for error checking in marker detection, or for providing optically-readable data as described below. The marker 100 is two-dimensional (2D), but, due to the small width compared to marker length, may be considered as effectively one-dimensional (1D) in at least some embodiments, the marker 100 extending along an axis.

The three elements comprise a dash 102 and two dots 104, 106.

The dots 104, 106 may be thought of as small individual points. Dots 104, 106 are arguably the smallest possible detectable features in images as only a single pixel is required to provide a dot. Dots 104, 106 may be at least substantially circular, as in the embodiments shown. Dots 104, 106 may also take other shapes, for example being square, e.g. in the case of a single pixel. In additional or alternative embodiments, dots may be triangular, rectangular, diamond-shaped, pentagonal, hexagonal, octagonal or of any other shape (regular or irregular). In the embodiments being described, the dots 104, 106 are called dots, irrespective of shape—dots are small regions identifiably different from the surrounding background and are not elongate. Unlike line features, dots do not require an "edge" with a specific orientation to remain detectable. As long as a single pixel is brighter or darker than the surrounding region in the image then it is possible to detect the point. Various efficient approaches on current hardware for the detection of these individual points are known in the art, and the skilled person would appreciate that any such approach may be used as suitable.

The skilled person will appreciate that there are many possible methods available for the detection of all dots/points in the image. One particular approach, inspired by the FAST corner detection method published in the paper "Machine learning for high-speed corner detection" by Eduard Rosten and Tom Drummond in Proceedings of European Conference on Computer Vision, 2006, is described in PCT/GB2018/052383. FAST corner detectors are well suited to rapid implementations on current hardware, and a change to the FAST corner metric alters its behaviour so that dots are detected rather than wedge-shape structures. In embodiments of the invention, pixels are defined as representing dots when the central pixel is either brighter or darker by more than a threshold of all of the 16 pixels in the ring around the pixel under consideration. This results in even faster processing times than the FAST corner detectors, as pixels in regions of similar brightness can be discarded as potential points after a single comparison (if the compared pixel is within the threshold of the value of the pixel being considered). Different detection algorithms may be used in other embodiments.

With current technology, it is possible for an implementation of such a point detector method to run (e.g. on a half-sampled image pyramid) in under 10 ms on mobile device hardware (e.g. a smart phone), so as to identify candidate dots which may be part of a marker 100. The other aspects of detecting the full optical marker 100 (grouping of dots and a dash by geometric constraints and computing the full image transformation) can run in under 1 ms. Thus it is possible to run the entire method 700, 900 described below to detect the region of interest at more than 30 frames per second (FPS) even on resource-constrained mobile devices.

The high speed enabled by the presented method allows it to run on live frames produced by the internal camera of a mobile computing device such as a smartphone at 30 FPS or higher. This further allows the presented optical marker to be used as a target for Augmented Reality content; where additional digital content can be overlaid on the region of interest and will track the movement, scale and orientation of the article marked with the marker 100 as it is moved within the camera view.

By contrast to the dots 104, 106, the dash 102 is elongate. FAST corner detection may be used to identify two or more vertices of the dash 102 in some embodiments. Other algorithms may be used to identify the dash 102 in other embodiments, for example using a linear scan along an axis defined by pre-identified dots 104, 106. As dash detection is generally only performed in specified locations based on the identification of dot pairs, whereas dot detection may be performed over the whole image, the efficiency of the dash detection algorithm may be less important to overall efficiency of implementations of the invention described herein.

The dash 102 and two dots 104, 106 are arranged in a pattern, the pattern being designed to allow detection of the marker 100.

The dash and dots 102, 104, 106 are collinear; i.e. they are arranged in a straight line. The dash and dots 102, 104, 106 are arranged along a common axis which passes centrally along the length of the dash 102 and centrally through each dot 104, 106.

The dots 104, 106 are of the same size and shape, and are adjacent to each other. The dots 104, 106 are both on the same side of the dash 102, and next to a shorter side of the dash 102.

Figure 6:
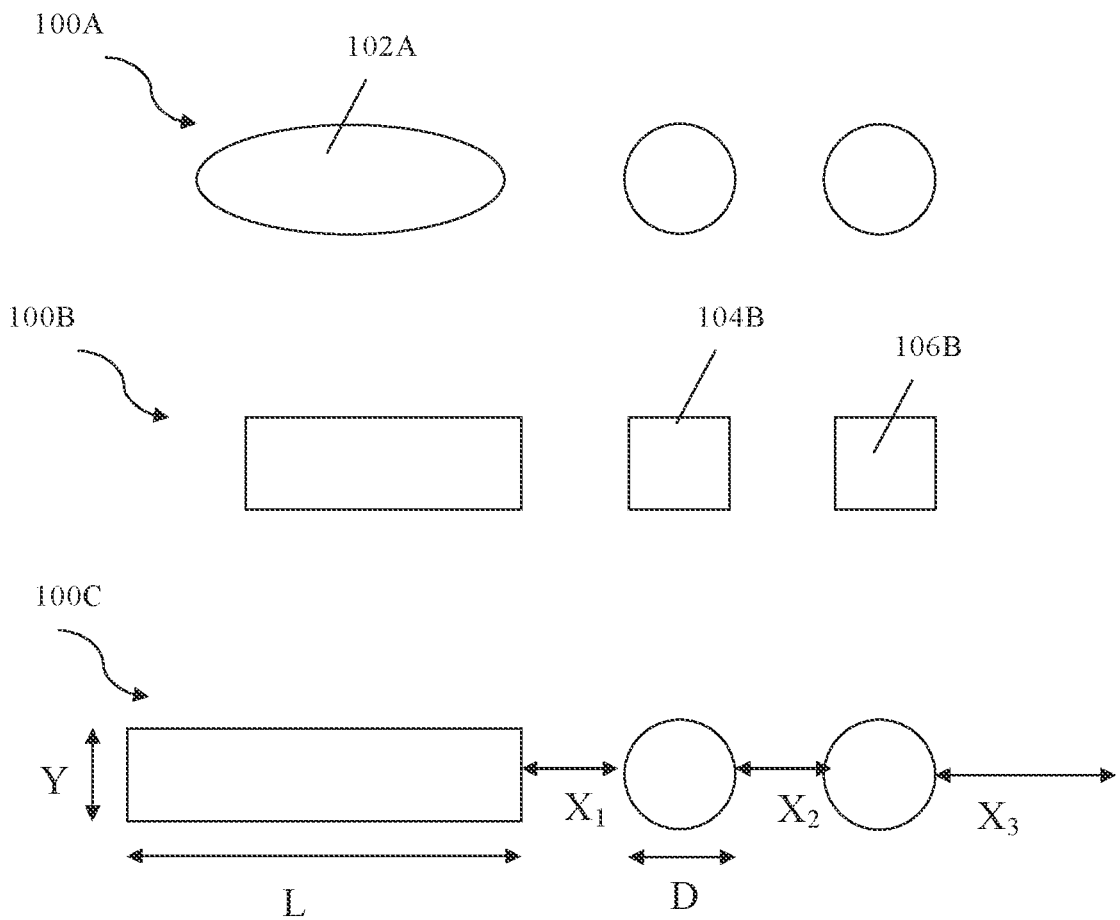
FIG. 6 illustrates various marker designs.

In the embodiment shown in FIG. 1, the dash 102 is rectangular in shape and the dots 104, 106 are circular. In alternative embodiments, shapes may differ—for example the dots 104B, 106B may be polygonal (e.g. square) and/or the dash may be oval in shape 102A, as shown for the markers 100A, 100B in FIG. 6.

The marker 100 is 2D, and each element 102, 104, 106 may therefore be thought of as having a first dimension, X, along the length of the common axis, and a second dimension, Y, perpendicular to that axis. The dots 104, 106 have at least substantially equal extents in each dimension, for example the diameter D marked in FIG. 6. For non-circular dots, this size measurement may instead be referred to more generally as a dot dimension, D. By contrast, the dash 102 is significantly longer in the X-dimension than it is in the Y-dimension, generally being at least twice as long as it is wide. This difference in length ratio between the two dimensions is what distinguishes the dash 102 from the dots 104, 106, irrespective of shape of these elements.

In various embodiments, the shorter (Y) dimension of the dash 102 is equal to the (Y) dimension of the dots 104, 106. Where the Y dimension varies along the X-axis (e.g. for curved elements), the widest point is taken for this comparison.

In various embodiments, the longer (X) dimension of the dash 102, which may be described as its length, L, is equal to at least twice, and optionally at least three or four times, the dimension of the dots 104, 106. Where the X dimension varies along the Y-axis (e.g. for curved elements), the longest point is taken for this comparison.

The elements 102, 104, 106 are separated by a first gap, $X_1$, between the dash 102 and the dot 104 closest thereto, and a second gap, $X_2$, between that dot 104 and the second dot 106. In the embodiments shown, the gaps $X_1$, $X_2$ are at least substantially the same size, and at least substantially equal to dot diameter, D. In alternative embodiments, the gaps $X_1$, $X_2$ may be of different sizes, and/or may be differently sized compared to dot size—for example having a length greater than or equal to half of the dot dimension, D, and optionally smaller than or equal to four times the dot dimension, D, and optionally smaller than the dot dimension, D.

In various embodiments, the distance, $X_2$, between the dots 104, 106 of the marker 100 is arranged to provide an indication of the location and/or length of the dash 102 of the marker 100. For example, the distance $X_2$ may provide an indication of how far along the common axis from the closest dot 104 the dash 102 should start, and/or of how long the dash 102 is relatively.

In additional or alternative embodiments, the dimension, D, of each dot 104, 106 of the marker 100 is arranged to provide an indication of the location and/or length of the dash 102 of the marker 100. For example, the length D may provide an indication of how far along the common axis from the closest dot 104 the dash 102 should start, and/or of how long the dash 102 is relatively.

In various embodiments, the dimension, D, of each dot 104, 106 of the marker 100 is arranged to provide an indication of the location of the other dot 106, 104, such that an algorithm searching for a marker 100 "knows" within what region to search for a second dot on discovering a first, and can discount any dot pairs with inappropriate spacings relative to their size.

In various embodiments, the dots 104, 106 define a line along which the dash 102 is to be sought. A blank region of length $X_3$ may be provided on the side of the dots furthest from the dash 102. It will be appreciated that, in the examples described herein, the markers 100 are shown as either white images on a black background or black images on a white background—whichever colour is the background is therefore classed as "blank"—in various embodiments, different colours or shades may be used provided that there is sufficient contrast for the marker 100 to be identified.

In embodiments in which space $X_1$ is arranged to be less than twice the dot dimension, D, length $X_3$ may be set to be greater than or equal to twice the dot dimension, D. The size of the blank area following the second dot 106 from the dash 102 may therefore be set to avoid ambiguity about in which direction along the line the dash 102 should be sought. One or more dashes may be present beyond the blank region $X_3$, for example forming part of a data region 300 as described below. The relative sizes and spacings may therefore allow a processing unit to determine which dash is the dash 102 of the marker 100—for example having a spacing of one unit or less between elements of the marker 100, and a spacing of at least two units on the far side of the second dot 106 from the rest of the marker 100. For example, if the dot dimension D is taken as one unit, the spacing between the dots 104, 106 and the spacing between the dot 104 and the dash 102 may be approximately equal to, but slightly smaller than, the dimension, D, and a blank space on the far side of the second dot 106 may have a length of at least twice D.

It will be appreciated that, in seeking to identify a marker 100, a width of the dash 102 may be checked as well as its length along the line defined by the dots 104, 106, to ensure that the mark is a dash 102 rather than a wider image not related to a marker. In general, the width of the dash 102 may be set to be at least substantially equal to the dot dimension, D. A blank spacing of at least one unit may be provided on either side of the dash 102, for some or all of the length of the dash 102, and generally for at least a first portion of the length of the dash, nearest the dot 104. A processing unit may search along a scan line determined by the dots 102, and then check one or more parallel lines either side of that initial scan line to ensure that the non-blank line identified as likely to be the dash 102 is indeed a dash.

Figure 2:
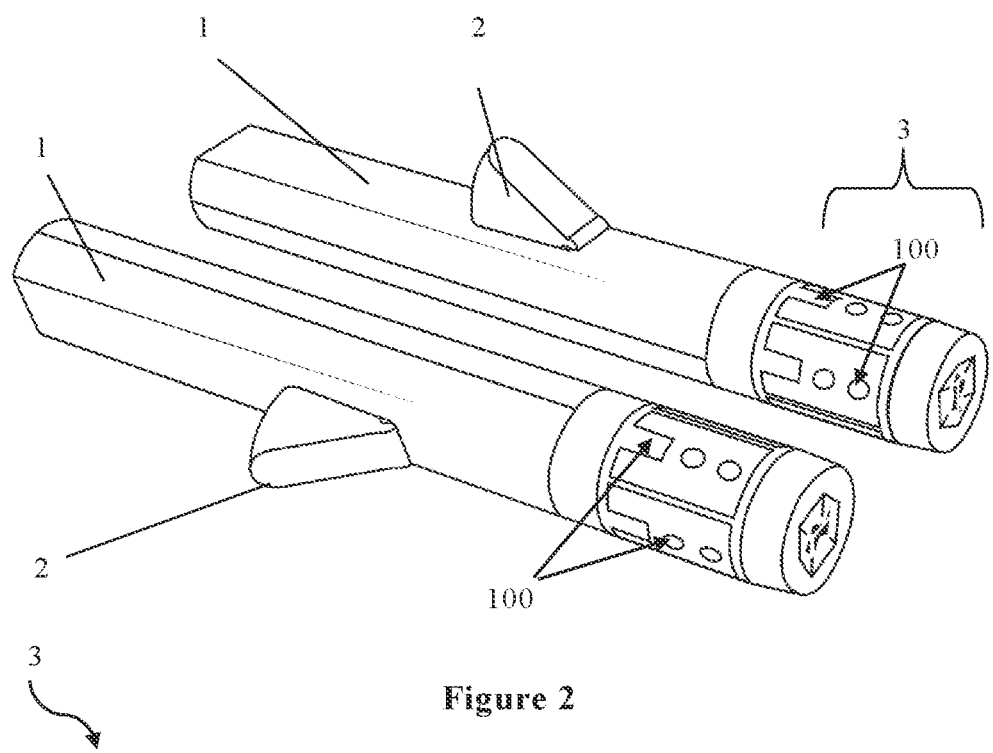
FIG. 2 shows a pair of "wand" controllers, each marked with multiple markers as shown in FIG. 1.

FIG. 2 illustrates the marker 100 of FIG. 1 in use on a physical object 1. The physical object 1 of the example shown is an AR controller, and, in the embodiment being described, may be described as a wand 1 due to its at least substantially cylindrical shape. The wand 1 comprises a control button 2, arranged to facilitate a comfortable grip by a user and to allow a user to provide an input, e.g. by pressing the button 2. The wand 1 has an end region 3 spaced from the control button 2. The end region 3 is arranged to be located at or near the end of the wand 1 not arranged to be within a user's hand, such that it is visible in use—this may be referred to as a forward end region. The control button 2 may be shaped, and/or other ergonomic features or markings may be provided, so as to encourage a user to hold the wand 1 at or near the other end, leaving the end region 3 unobscured.

The end region 3 is arranged to be marked with a marker 100 as described above. In particular, in the embodiment shown, the end region 3 is marked with a row of parallel, non-collinear, markers 100, arranged around a circumference of the wand 1. At least one marker 100 may therefore be visible and so detectable at any angle of rotation of the wand 1 around its axis. The axis of each marker 100 is aligned with the wand axis in the embodiment shown.

Figure 3:
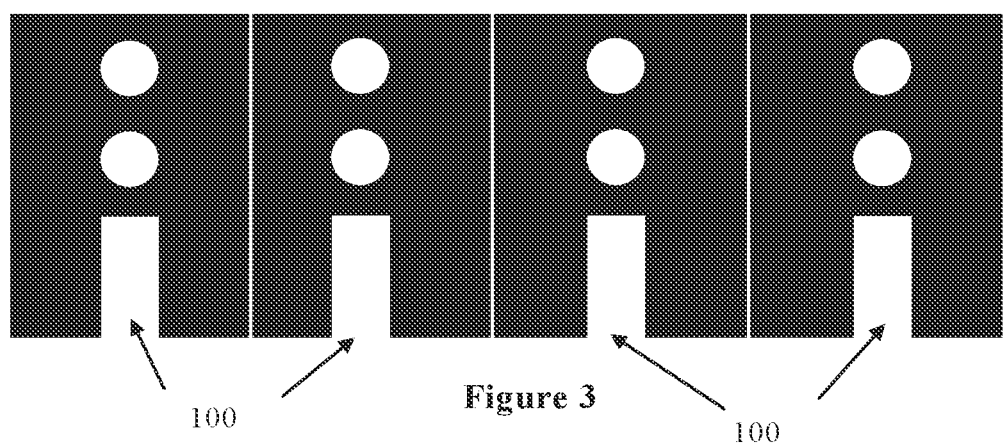
FIG. 3 shows a composite marker as shown in FIG. 2, formed from multiple markers as shown in FIG. 1.

FIG. 3 illustrates a "flattened out" version of the markers 100 as arranged on the end region 3 of the wand 1 of FIG. 2. The grouping of markers 100 may be referred to as a composite marker 200.

It will be appreciated that the wand 1 is simply one example of a physical object, or article, which may be marked using one or more markers 100 as described herein, and is not intended to be limiting. Further, in some embodiments, such markers 100 may be used to mark non-physical entities, such as images displayed on a computer or television screen.

In various embodiments, the one or more optically readable markers 100 on the entity 1 are arranged to allow the location, and optionally also the orientation, of the marked entity 1 to be determined. For example, tracking the wand 1 with time as it is moved by a user may enable an AR system to infer user movements through an AR game, and/or to detect user gestures which may have in-game effects, e.g. interactions with other AR entities (which may or may not have any physical presence).

In various embodiments, the pattern of two dots 104, 106 and a dash 102 is the only mark or pattern provided for detection of the presence (and/or position) of the marker 100, and thereby of the entity 1, 10. In embodiments with multiple markers 100 on a single entity 10, the multiple patterns of two dots 104, 106 and a dash 102 may be the only marks or patterns provided for detection of the presence (and/or position) of the entity 10.

Figure 4:
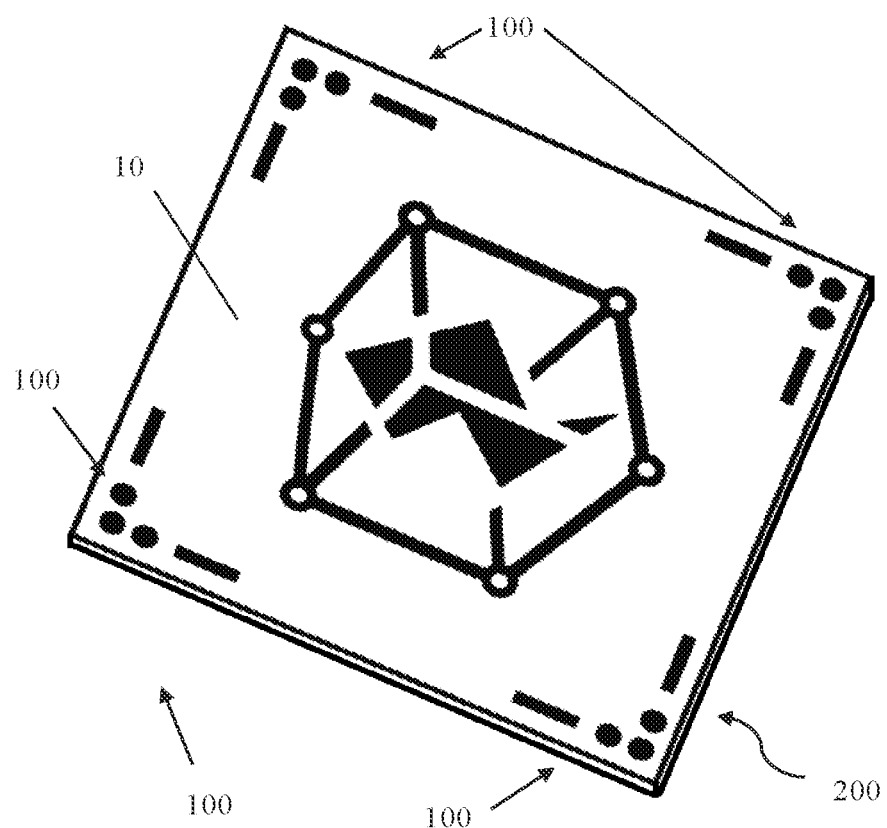
FIG. 4 shows a mat marked with multiple markers.
Figure 5:
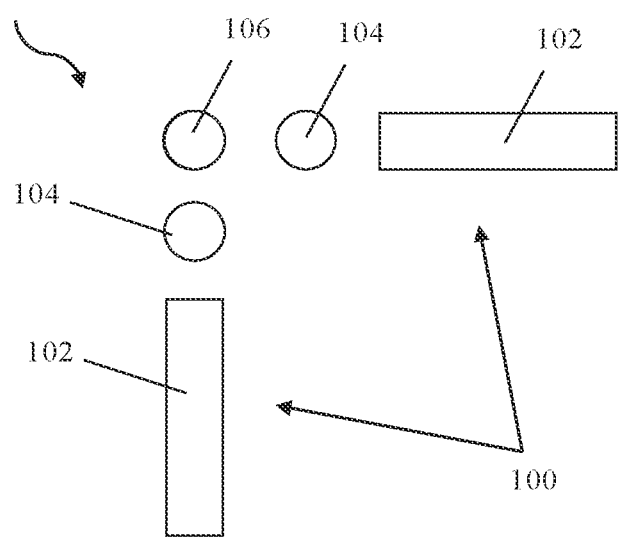
FIG. 5 shows a composite marker as used on the mat of FIG. 4.

In the embodiment shown in FIGS. 4 and 5, the optically readable marker 100 forms part of a composite marker 200. A composite marker 200 comprises two or more markers 100 in known relative positions (location and orientation). The composite marker 200 shown comprises two, conjoined, markers 100 as described above. In particular, two non-parallel and non-collinear dash-dot-dot patterns are shown, sharing a dot 106. The two markers 100 each extend away from the common dot 106, along different axes. The dot 106 is located where those axes cross. Three or more markers may be combined to form other composite markers 200. In alternative embodiments, some or all of a dash 102 may be shared between markers, instead of a dot 104, 106 being shared—the composite marker 200 may therefore comprise two or more markers 100 sharing an element of the marker, be that a dot 104, 106 or a dash 102.

In particular, in various embodiments, any of the features (either dot 104, 106, or the dash 102) could be shared between individual markers 100 of a composite marker 200. For the dash 102, the whole of the dash 102 may be shared in embodiments in which the two markers 100 sharing the dash 102 are co-linear (forming a dot-dot-dash-dot-dot pattern); in other embodiments, just a portion of the dash 102 may be shared, as in the L-shaped corner marker design discussed below with respect to FIG. 11.

Figure 10:
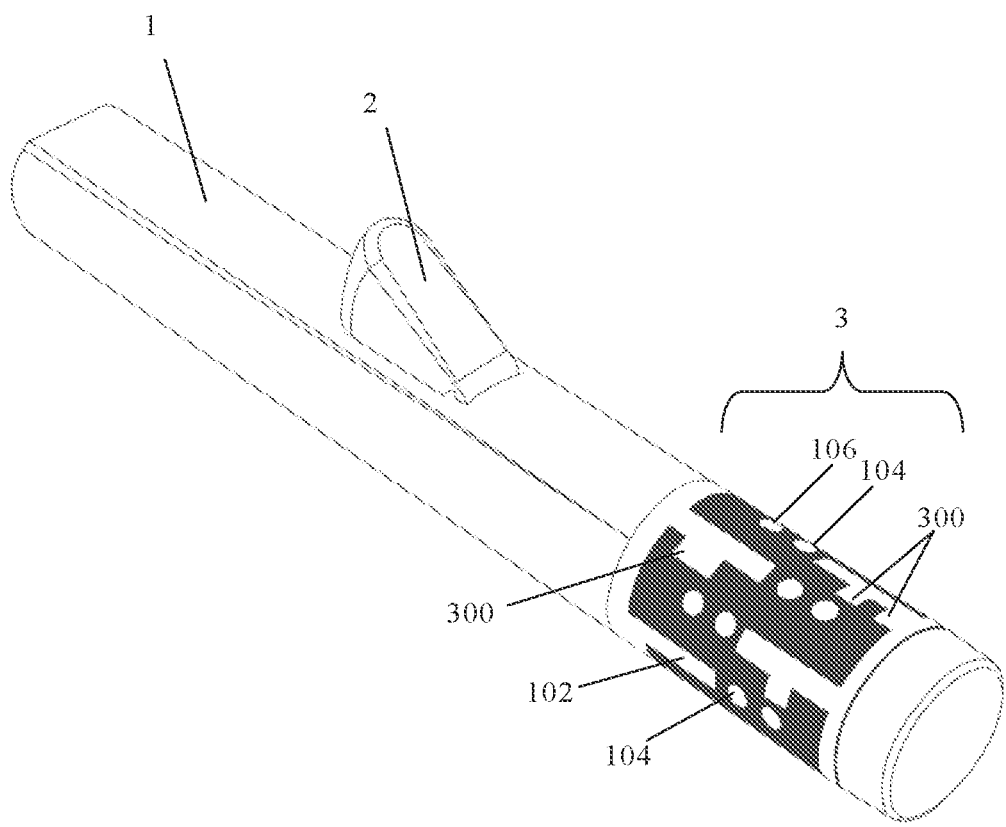
FIG. 10 illustrates a controller marked with a different marker design from that shown in FIGS. 2 and 3.

In additional or alternative embodiments, a composite marker 200 may comprise multiple markers 100 which are not conjoined—for example a set of parallel markers as shown in FIGS. 2, 3 and 10. It will be appreciated that, whilst a single marker 100 can define an axis along the length of that marker (x-axis), more information about its own "y" axis may be helpful for accurate determination of location and/or orientation in various AR use cases—a second, off-x-axis, marker 100, or another off-x-axis mark, may therefore help to increase location determination accuracy. Obtaining a full image transformation from a single marker 100 may be difficult due to the collinearity, so marking an entity with a plurality of markers 100 in a known arrangement, which may be referred to as a composite marker 200, may be preferred in various embodiments.

Composite markers 200 therefore encompass a large number of possible marker arrangements in various embodiments—some sharing elements 102, 104, 106, and others not sharing elements but still having defined relative positions.

It will be appreciated that, for composite markers 200 in which two or more markers 100 share a dot 104, 106, circular dots 104, 106 may allow any angle between the axes to be used, provided that the angle is large enough for the elements of the marker not to overlap, and is preferably not equal to 180 (as a row of three collinear dots may cause disambiguation issues in processing, for example). For non-circular dots 104B, 106B, usable angles may depend on the rotational symmetry of the dot 104, 106—for example, angles of 90° and 270° may be used for square dots, and angles of 120° and 240° may be used for equilateral triangular dots.

For composite markers 200 in which two or more markers 100 share a block which provides a dash 102 for each marker 100, block shape may depend on the number of markers 100 and the relative angles—for example, an L-shaped block may be used for a composite marker 200 comprising two markers 100. The composite marker 200 may comprise two perpendicular markers, so forming an L-shape with a 90° angle, or two markers at a different angle, such that the angle of the L-shaped block is different; e.g. between 30° and 120°. In other embodiments, more than two markers 100 may share a block, for example three markers sharing a Y-shaped block, the Y-shaped block providing three dashes. It will be appreciated that many different designs may be envisaged based on the disclosure herein.

In the embodiments shown, markers 100 of each composite marker 200 have elements of the same size and shape. In other embodiments, element size and/or shape may vary between markers 100 of a given composite marker 200.

FIG. 4 illustrates an article 10 marked with a composite marker 200. In particular, the physical object 10 is a square mat comprising four composite markers 200, one at each corner. The mat 10 may be an example of a "world marker"/location marker for use in AR applications, for example defining a point on a perimeter of a safe gaming area, or the location of an AR object.

In the embodiment shown in FIGS. 4 and 5, each composite marker 200 comprises a total of two markers 100, i.e. two dashes 102 and a total of three dots 104, 106, of which one is shared between the markers.

The angle between the two markers 100 is at least substantially equal to 90 in the example shown, and each marker 100 is oriented along an edge of the mat 10, meeting at or near a corner of the mat 10.

FIGS. 2 and 4 provide two examples of marked entities 1, 10 each marked with multiple optically readable markers 100 each comprising a set of two dots 104, 106 and a dash 102. The relative positions of markers 100 differ between the two entities, and it will be appreciated that these examples are not intended to be limiting—many different arrangements of one or more marker 100 may be provided on different entities 1, 10.

It will be appreciated that whilst the present invention is described mainly in terms of use of a marker 100, 200, or of a marked entity 1, 10, as described above for augmented reality applications, such markers and entities may be used in a wide variety of applications and the use in AR is not intended to be limiting.

In some embodiments, determination that a marker 100 is present may be sufficient. In other embodiments, determination of the position of a marker 100 may be needed, e.g. the marker location and/or orientation relative to a camera or a known point in space. The position of a marked entity 1, may be determined from the determined marker position. In additional or alternative embodiments, additional data may be provided as a part of, or associated with, the marker 100. This data is arranged to be optically readable, such that it can be extracted from an image of the marker 100.

One or more dot-dot-dash patterns may therefore be combined with encoded data to provide a marker 100 that offers fast detection (of the marker, and optionally thereby of the data region) by use of the dot-dot-dash pattern, combined with an "identity" or other information which may be encoded in the data in the marker 100.

Figure 8:
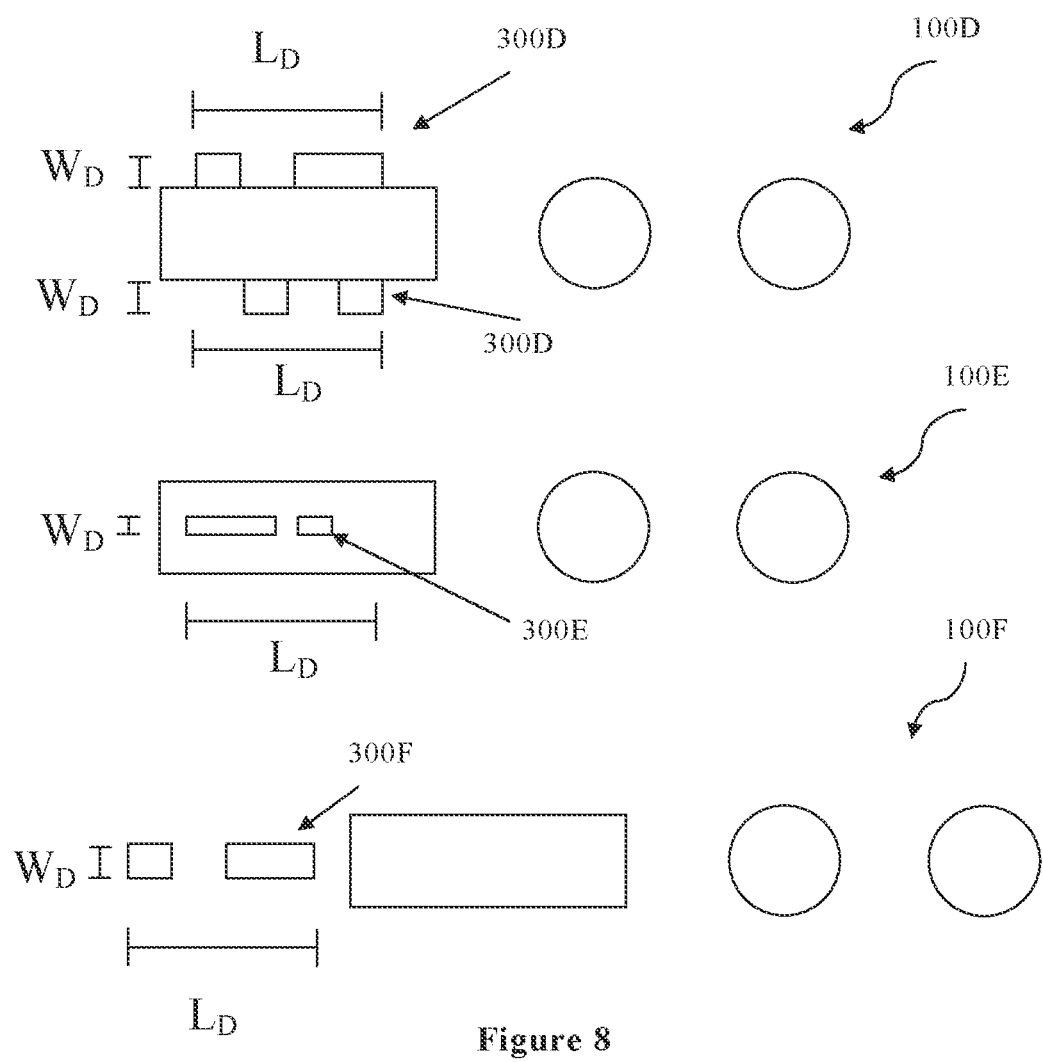
FIG. 8 illustrates three ways in which data to be read may be incorporated into the optical marker.

In various embodiments, such as those 100D, 100E, 100F shown in FIG. 8, the marker 100 further comprises optically-extractable data. The optically-extractable data are located within one or more data regions 300 associated with the pattern of two dots 104, 106 and a dash 102. The one or more data regions 300 each have a known size and position with respect to the pattern 102, 104, 106. In some embodiments, the dash 102 and dots 104, 106 may be wider the data region(s) 300. As the dash-dot-dot pattern of the marker 100 serves to identify the marker 100 and thereby the data region location, the data region 300 itself can be relatively small and unobtrusive. In other embodiments, a width of the marker 100 may be minimised to save space/reduce area overheads, and the data region 300 may be at least the same width as the marker in such embodiments. In embodiments with composite markers 200, the location of one or more data regions 300 may be defined relative to the overall composite marker 200—for example being centrally-located along a y-axis between two parallel markers 100 each extending in the x-direction.

In the first embodiment shown in FIG. 8, the marker 100D comprises two data regions 300D, each arranged along one of the longer sides of the dash 102. The two data regions 300D are the same size, each having a length, $L_D$, parallel to the length of the dash 102, and a width, $W_D$, parallel to the width of the dash 102. The length, $L_D$, is smaller than or equal to dash length, and in various embodiments may be selected to be shorter than the dash length and spaced from the end of the dash, such that corners of the dash 102 may be identified more easily. The width, $W_D$, is selected to be at least approximately equal to the dash width in some embodiments. In other embodiments, the data region width may be greater than or less than the dash width, for example being equal to one third or one half of the dash width. It will be appreciated that a smallest detectable size of the dot 104, 106 is a single pixel, and that the dash 102 may be selected to have the same width—in embodiments in which the smallest detectable marker size is chosen, the bits may be at least the size of the dots 104, 106 to remain identifiable.

Bits may be provided in the form of a binary code—e.g. black or white/colourless squares providing binary zeros and ones. Each data region comprises a single row of bits in the embodiments shown, although this may vary in other embodiments. For example, in alternative embodiments, data may be provided in a different format—e.g. alphanumeric data—and/or multiple rows may be provided.

The dash 102 may therefore be extended so as to have rows of bits on one or both sides. The bits may be connected to the dash 102 at one side as shown, so ensuring that the data bits themselves would not be detected as dots of a marker.

In the second embodiment shown in FIG. 8, the marker 100E comprises a data region 300E embedded within the dash 102. Bits, or differently formatted data, may be provided in one or more rows within this region. The data region 300E is selected to have a width and length each shorter than the corresponding dimension of the dash 102.

In the third embodiment shown in FIG. 8, the marker 100F comprises a data region 300F in line with the dash 102, and on the far side of the dash 102 from the dots 104, 106. This data region 300F may comprise one or more rows of bits or other optically readable data. It will be appreciated that certain arrangements of bits in this configuration (e.g. 01010111) may look similar to a dot-dot-dash pattern and therefore be mistakenly identified as a second marker. Caution should therefore be used if implementing such a data area, for example providing it with a solid border to join the "dots". Again, the width of the data region 300F may be selected to be smaller than that of the dot-dot-dash pattern in some embodiments, and may be equal to or greater than that width in other embodiments.

This third embodiment 100F is in some ways similar to a traditional 1D barcode, in which a specific pattern of light and dark is used to signal the start and end of the code, and a barcode reader is arranged to ensure that those start and end marker patterns are not treated as data to be interpreted. However, an advantage of the dot-dot-dash pattern as described herein over a 1D code is that the dots are straightforward to detect in a 2D image such as from a camera smartphone. 1D barcode scanners need correct alignment of the data with the scanline so are not generally suitable for detecting a marker 100 under arbitrary transformations in a 2D image, as is required for AR markers. The end markers of a 1D barcode only denote the start and end of the data, and are not arranged to be used to identify a location or orientation of the barcode, as it is assumed that this will be correctly aligned by a user when scanning. By contrast, in the present disclosure, the dot-dot-dash pattern 102, 104, 106 is not used to encode information (e.g. recognition/identity of a marker, and/or associated information), but rather simply for detection of the presence (and optionally position) of a marker-identifying that a marker is present rather than identifying to what the marker relates. A marker identity and/or associated information may be encoded into the data regions 300 associated with that dot-dot-dash pattern.

In all embodiments described herein, a size and position of the data region(s) 300 relative to the dot-dot-dash pattern is known in advance, such that a system arranged to extract the data can determine where the marker 100 is, and where to look for the data, based on the identified dot-dot-dash pattern.

It will be appreciated that the three examples of data regions 300D, 300E, 300F shown are illustrative only, and not intended to be limiting.

FIG. 10 illustrates a controller wand 1 like those shown in FIG. 2, but with a different arrangement of markers 100 and incorporated data regions 300. In particular, instead of all the dashes 102 extending away from the button 2 towards the dots 104, 106, with the dots 104, 106 being nearest the forward end region 3 of the wand 1, the markers 100 alternate in orientation (whilst still remaining parallel to wand length). In addition, bits of data 300 are encoded—in the embodiment shown, each dot 104, 106 has a diameter of one unit, and the dash 102 to be identified as a part of the marker 100 has a length of two units—the line then continues (i.e. the dash is longer than two units), providing a data region 300 on one or both sides of the extended portion. No bits are provided on the sides of the first two units of the dash length—the full length of the un-extended dash—so that it can be correctly identified as a dash of the marker 100. In other embodiments, only one unit of the dash length may be free of the data region; importantly, at least a specified region of the dash 102 (e.g. a portion closest to the dot 104) has no bits thereon, otherwise a processing unit may not be able to identify the dash 102 due to its increased width. In the example shown in FIG. 10, bits are provided on one side of the extended dash only—both sides may be used as data regions 300 in other embodiments.

Figure 11:
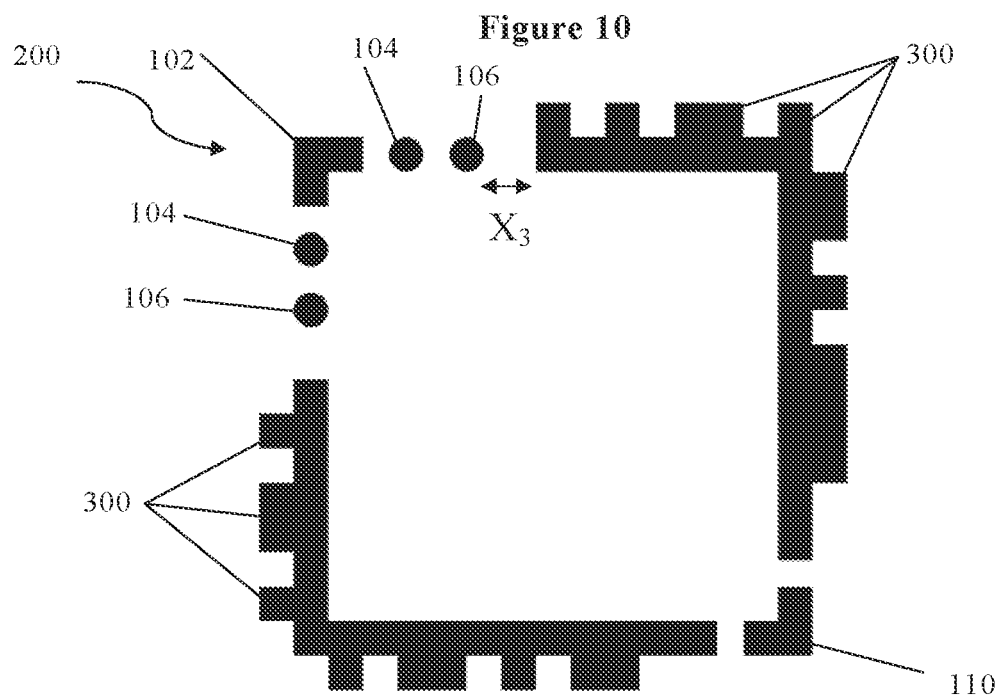
FIG. 11 illustrates a marker design with a large data region.

FIG. 11 illustrates a marker 100 with a much larger data region 300. A larger amount of information may therefore be encoded in the marker 100, and read from the marker 100, as compared to the marker design shown in FIG. 10. For example, the data region 300 on the controller 1 shown in FIG. 10 may simply encode an identity of the controller 1 (for example allowing a user to be identified based on the controller 1 used), whereas the larger data region 300 of the marker 100 shown in FIG. 11 may encode information about a place, object, or other entity, real or fictional, forming a part of the AR "world"—it may be used as a world marker.

In the embodiment shown, the marker 100 is a composite marker 200, with two conjoined dashes 102 forming an L-shape, and a pair of dots 104, 106 extending from each end of the L-shape. The L-shaped block therefore provides the dash 102 for each marker 100. A part of each dash 102, at the corner of the L-shape, is therefore shared.

The marker 100 may be designed for a square mat 10 such as that shown in FIG. 4, or for application on any surface, image or object. Unlike the example shown in FIG. 4, only a single composite marker 200 is provided, rather than one at each corner of the mat 10. In other embodiments, two composite markers 200 may be provided—for example on diagonally opposite corners.

In the embodiment of FIG. 11, a data region 300 is provided in a substantially square shape—with lines extending parallel to the lines of the composite marker 200. The larger blank space, $X_3$, between the dot 106 and the line of the data region 300, as compared to the spacing between the elements of the marker 100, may be used to ensure that the line of the data region 300 is not seen as a dash of the marker 100, even if/when there are no bits adjacent that line at its closest point to the marker 100. In the embodiment shown, bits are provided on the outside of the line only. As the bits are conjoined with the line, they should not be incorrectly identified as dots of a marker. In other embodiments, bits may be provided on both sides of the line, as illustrated by the dotted regions in FIGS. 12 and 13—these figures illustrate an embodiment in which the data regions 300 provide four bits on each side of each (extended) dash 102. In these embodiments, one unit of dash length is necessarily free of the data region 300/bits on either side, so ensuring that it can be recognised as a dash 102, and each bit is around the same size as a dot 104, 106. In other embodiments, more than two units of dash length may be left before the data region 300 starts, and/or bits may be differently sized—e.g. being smaller than the dots 104, 106.

In the embodiment of FIG. 11, the composite marker 200 has an L-shaped line providing both dashes 102—on the inner side of this L-shape, only one unit of blank space is provided by the side of the dash 102—the algorithm used to identify the dash may therefore take this into account, for example only checking for one unit of blank space, or explicitly looking for an L-shaped mark. Indeed, the embodiment of FIG. 11 includes an L-shape 110 on the corner diagonally opposite the marker 100, separated from/breaking the line of the data region 300—this second L-shape 110 may also be found in some embodiments to help identify and/or determine the orientation of the marker 100 and/or an extent of the data region 300.

Figure 12:
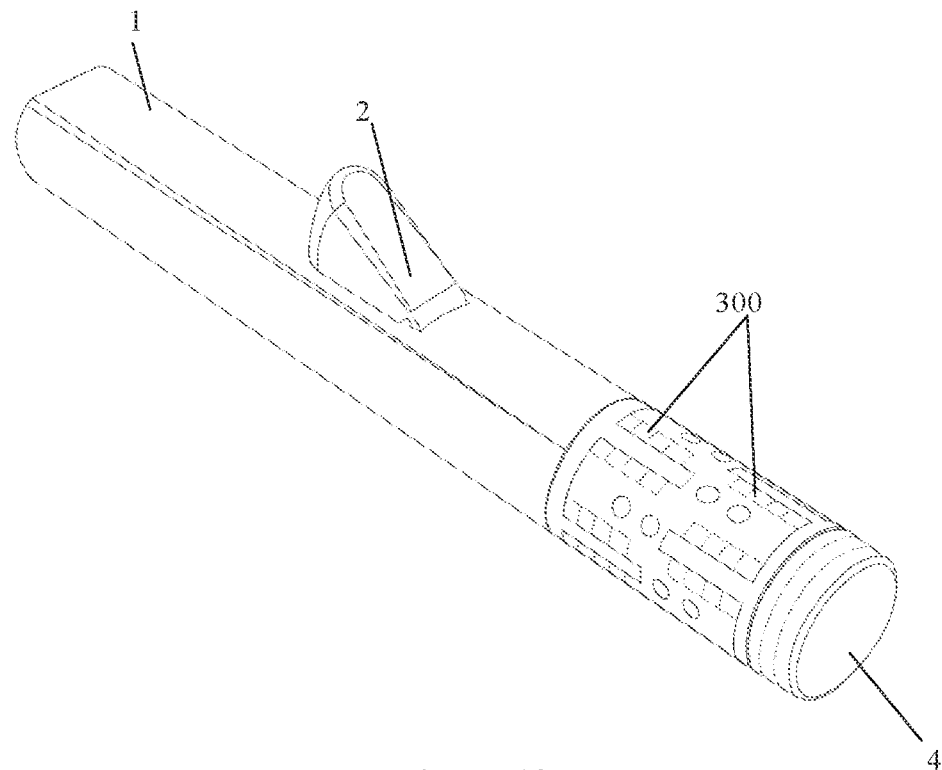
FIG. 12 illustrates a schematic view of the controller shown in FIG. 13, emphasising the design of the data region.
Figure 13:
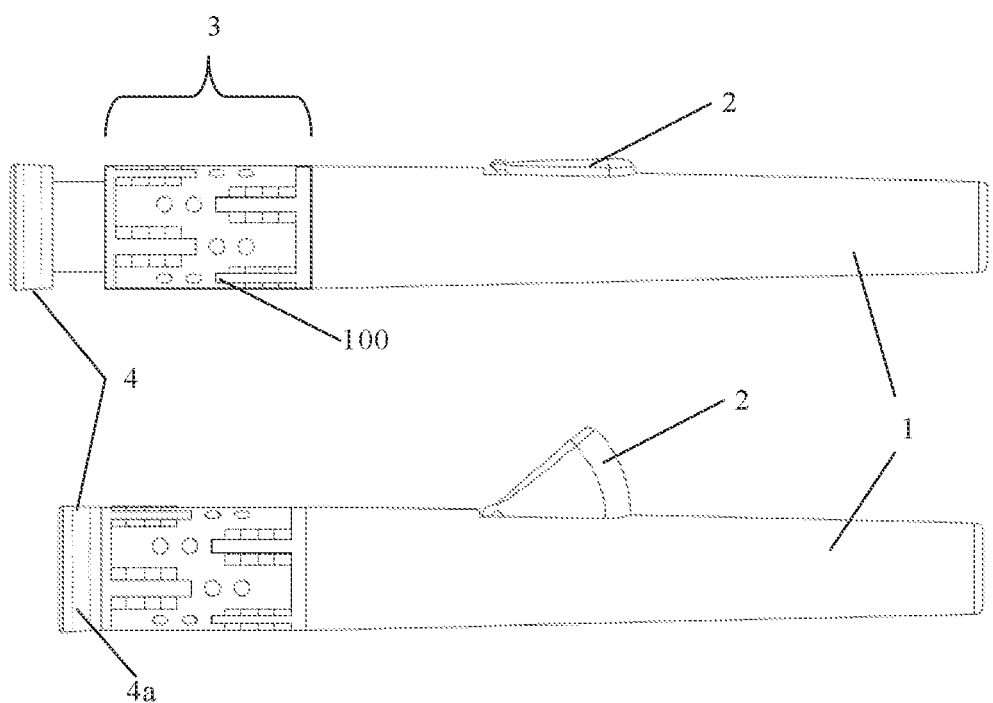
FIG. 13 illustrates two side views of the controller of FIG. 12, in two different configurations.

In the embodiment shown in FIGS. 12 and 13, when the button 2 is depressed, a moveable, forwardmost, part 4 of the controller 1 extends forward, along the line of the controller 1. The moveable end region 4 and the button 2 may be biased to return to their original positions when the button 2 is released (e.g. by a spring or other biasing member). This change in position of the moveable end region 4 may allow a camera to detect activation of the button 2, and to perform an action such as making a change in an AR environment accordingly. In various embodiments, the moveable end region 4 may have a band 4*a* of a contrasting colour from the background, and/or another kind of marking, to allow the change in position to be optically detected more easily.

Methods of using markers 100 as described above are illustrated in FIGS. 7 and 9.

Figure 7:
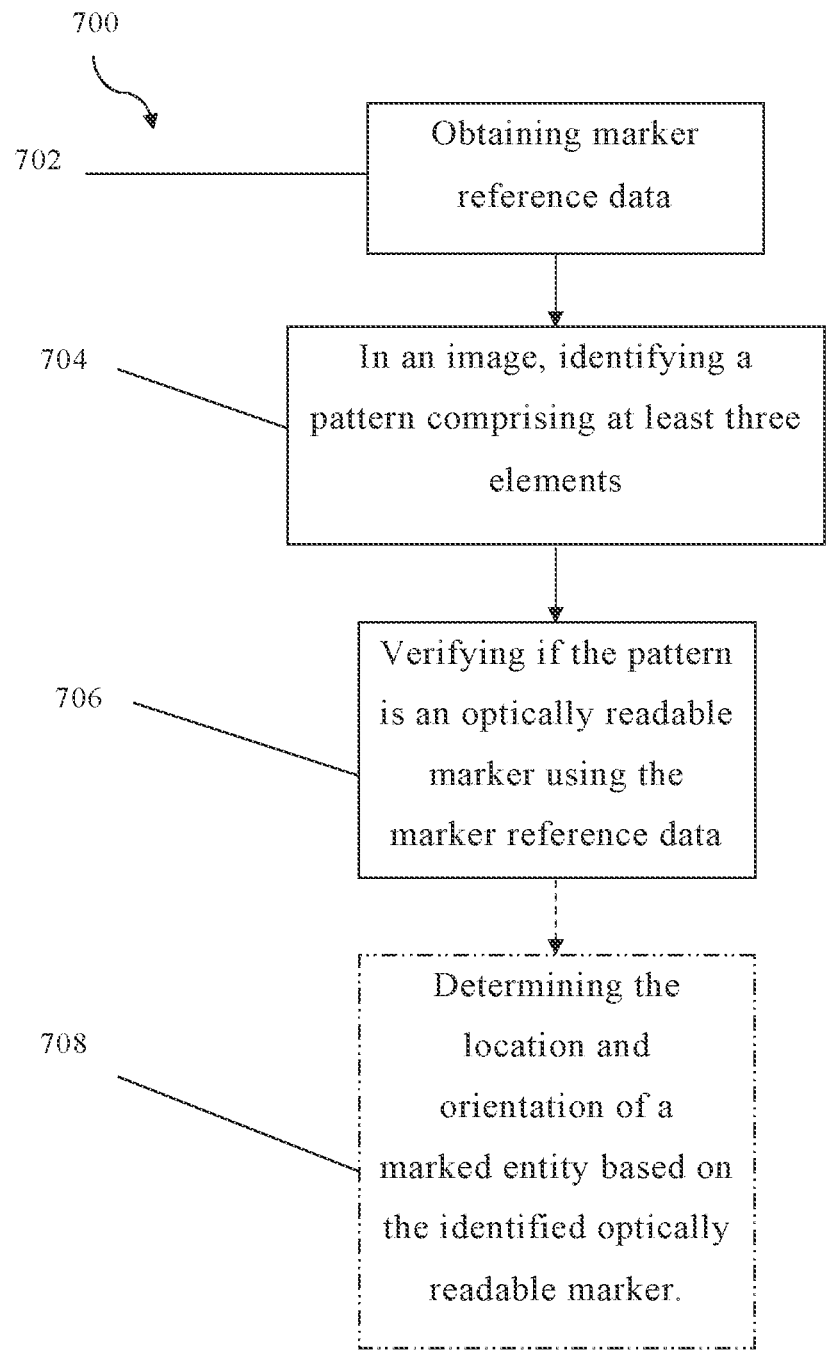
FIG. 7 illustrates a method of use of a marker for position determination.

FIG. 7 illustrates a method 700 of identifying the presence of an optically-readable marker 100.

The method 700 comprises obtaining 702 marker reference data. The marker reference data provides data relating to a template for an optically readable marker 100 comprising a dash 102 and two dots 104, 106, wherein the dash and dots are collinear, and wherein the dots are of the same size and shape and adjacent to each other. The template defines what the marker 100 looks like when viewed straight-on, for example specifying that it comprises a rectangular dash 102 and two circular dots 104, 106, with particular sizes and spacings therebetween. It will be appreciated that, in an image of a marker 100, the marker 100 may be at an angle compared to the camera and that the image of the marker 100 may therefore not be identical to the template. Additionally, the size of the marker 100 in an image of an entity may differ from the actual size of that marker 100 on the entity 1, 10. Differences between the detected marker 100 and the template may be used to calculate a transformation between the two; this may provide useful positional information on the marker 100 (and thereby optionally of an entity 1, 10 marked by the marker 100), and/or may facilitate rectification of an image of a data region 300, such that the data may be read more reliably.

The method 700 comprises identifying 704 a pattern in an image, the pattern comprising at least three elements. The identifying 704 the pattern may comprise first looking for a pair of dots 104, 106 sufficiently close to each other (relative to their size) to fall within bounds defined by the marker reference data—the bounds may allow for angled views, which may distort the appearance of the marker 100. Once a suitable pair of dots 104, 106 has been identified, the presence of a dash 102 along the line through the dots 104, 106 may then be checked. Again, the marker reference data provides information on a known gap or spacing between a dot 104 and the dash 102, and/or on dash length. For example, the data may indicate that, following a black dot 104, there should be white for a known length relative to dot separation, followed by black for a longer known length relative to dot separation. Dot separation may be calculated between dot centres or between dot edges, along their common axis.

The method 700 comprises verifying 706 that the relative sizes and spacings of the elements 102, 104, 106 of the pattern correspond to an optically readable marker 100 as defined in the marker reference data, so identifying the pattern as forming an optically readable marker. An example of this step is finding a dash 102 with a suitable location and dimensions adjacent to a pair of dots as identified in step 704. In alternative embodiments, the dash 102 may be identified first, and then dots 104, 106 may be sought based on dash size and location.

Once the correspondences between the detected elements 102, 104, 106 and the reference pattern are known unambiguously, it is possible to compute an image transformation to align the detected elements 102, 104, 106 with the reference pattern/template (both location and orientation).

To determine an affine transformation (representing orientation, scale, and skew transformations), only three point correspondences are required. It will be appreciated that the three points cannot all be co-linear to allow a full image transformation, so at least one point should be off-axis with respect to the other two. In embodiments in which a single marker 100 is used alone, off-axis point correspondences may be found from the dash corners 102 and/or off-axis extents of the dots 104, 106—it will be appreciated that the dots and dashes should have a width greater than one pixel to facilitate use of such points within a single marker 100. For minimum-width markers 100, a separate off-axis point may therefore be needed—such as another, non-co-linear marker 100 at a known relative location, forming a composite marker 200.

It will be appreciated that minimum-width single markers 100 may be of particular utility in keeping a fiduciary marker as thin as possible in the y-direction whilst enabling fast detection without too many false positives from general background clutter. The effectively 1D layout of a single dash-dot-dot pattern 100 is therefore advantageous for uses where space is constrained on one axis, or for curved objects such as the controller 1 shown in FIG. 2—the collinear markers 100 on the controllers 1 remain collinear in the camera image when printed "along" the length of the controller 1. Keeping to a minimum width for a single marker 100 and using a composite marker 200 composed of multiple markers 100 may therefore be preferable to using a wider single marker 100 to provide off-axis points for the image transformation in such embodiments.

For patterns containing more than three points, a least-squares solution can be used to increase accuracy. With four correspondences or more a "homography" transformation can be determined, which can additionally represent perspective transformations due to the viewing angle of the pattern. The dots 104, 106 may each provide one point. The dash 104 may provide one or more points—e.g. a starting point of the dash 102 adjacent the nearest dot 104, and/or up to four corners of the dash.

The skilled person will appreciate that identifier patterns (e.g. markers 100 and/or composite markers 200) containing more than the minimum number of points required to compute a transformation may also allow the pattern to be detected even if some point detections are missing (due to, for example, marking errors, physical damage, occlusion of one or more marker elements or parts thereof, or lighting conditions preventing a point from being detectable in a given image).

In various embodiments, the method 700 further includes identifying 708 the location and orientation of the marker 100, and optionally of an entity 1, 10 marked with the marker 100. In such embodiments, the marker reference data may comprise information on the position of the marker 100 on the entity 1, 10. In such embodiments, the image used includes an image of at least a part of the entity, including the marker 100. It will be appreciated that the marker 100 may still be identified even if partially occluded in some embodiments; as such, the entirety of the marker 100 may not need to be visible in the image for successful identification. At least part of all three elements of a marker 100—i.e. of each dot 104, 106 and of the dash 102—must be visible for identification of the marker. For a composite marker 200, detection may be robust to occlusion of one or more marker elements 102, 104, 106.

The identifying a pattern within the image may therefore comprise detecting dots 104, 106 within the image; identifying a first pair of dots 104, 106 which have no other mark therebetween; determining one or more expected positions of a dash 102 based on the pair of dots; and searching for the dash 102 in the one or more expected positions. For example, two expected positions of the dash 102 may be identified—one next to dot 104 and the other next to dot 106, as the dots 104, 106 may be indistinguishable until the dash 102 is identified. In some embodiments, a larger blank/whitespace region, $X_3$, is provided on the right of 106 than the spacing region $X_1$ between dash 102 and dot 104 to remove ambiguity, as discussed above. An $X_3$ length of twice the $X_1$ length may be used in some embodiments.

In particular, the determining one or more expected positions of the dash 102 may comprise looking for a dash 102 adjacent to one of the dots 104 and collinear with the pair of dots, within an expected distance range of the dots, the distance being determined relative to the size and/or spacing of the dots 104, 106.

The skilled person will appreciate that some of the dots identified within an image may not be part of the identifier 100, for example being part of a background image. It is therefore necessary to determine which of the detected points in the image match each of the points in the reference pattern or template. For example, some dots may be discarded due to not having a second dot, or not having a second dot of the same size, within a known distance thereof (based on dot size of the first dot). Only pairs of dots may be retained for further analysis. The skilled person will appreciate that a set distance condition based on dot size may be used to reduce the geometric area to be searched for the second dot. Similarly, a set distance condition based on dot size and/or on dot spacing may be used to reduce the geometric area to be searched for the dash 102.

An individual point (e.g. dot 104) is unlikely to be a unique feature—most natural images contain some areas that are lighter or darker than the surrounding image region and so may appear as dots. Additionally a single point provides no information on orientation, and very limited scale information. Therefore a single point is not used as an identifier by itself—it is likely not to be unique, and does not enable a full image transformation to be calculated.

By combining two dots 104, 106 and a dash 102 into a fixed pattern, it is possible to increase the likelihood of uniqueness, and the use of a marker 100 with a sufficient width comprising a single such pattern, or of a composite marker 200 comprising multiple such markers 100 in a non-collinear arrangement, may provide the ability to calculate a full image transformation. At the same time, use of an efficient detection algorithm is possible, as is a low area overhead for the marker 100.

In various embodiments, an affine image transformation may be computed to align the reference pattern (marker template) with the detected dash-dot-dot pattern 102, 104, 106. Location and orientation of the marker 100 relative to a camera may therefore be determined.

In the embodiments being described, the measurements used to verify the configuration of multiple elements 102, 104, 106 as matching the marker template may have acceptance regions rather than requiring precise values. The skilled person will appreciate that, under an affine transformation, the ratios of lengths and perpendicular angles may not be exactly preserved, and that some lenience may therefore be required to accommodate different viewing angles and the like.

In embodiments with multiple markers 100 (e.g. a composite marker 200), a least-squares solution for the affine or homography transformation may be computed using a plurality of the markers 100, and optionally all of the markers 100, to give a greater degree of accuracy.

The location and orientation of the entity 1, 10 may then be determined based on the identified optically readable marker 100 and any transformations needed to map the image of the marker 100 to the marker template as defined in the marker reference data.

The method 700 of various embodiments comprises acquiring a two-dimensional image including the marker 100. The acquiring the image may comprise taking a photograph or using a live frame of a camera, or a pre-generated image may be provided. As the method 700 is arranged to work for photographs of marked objects 1, 10, and as photographs may be taken from different angles and distances, distances between marker elements 102, 104, 106 and sizes of marker elements may be determined relative to dot size and/or spacing rather than absolute values.

In particular, a two-dimensional (2D) image may be acquired at a processor. The image may be a photograph (e.g. of a 3D object or scene, or of a 2D surface), one or more live images from a camera, a scanned-in image, an image received by email or the like.

The skilled person will appreciate that, with current technology, digital images are generally captured as a two-dimensional array of individual pixels. In current hardware setups, images are generally presented for processing as a complete "frame" of data, containing all of the pixels in a particular image. This is distinct from line-scanning cameras, which deliver the image data one horizontal line at a time.

In various embodiments, the orientation of the entity 1, 10 may be uniquely determined using one or more identified optically readable markers 100, 200. In other embodiments, for example in embodiments with rotational symmetry, a non-unique position may be determined (e.g. one or more orientations being possible at a given location).

In various embodiments, such as those shown in FIGS. 2 and 4, the entity 1, 10 is marked with a plurality of markers 100. The method 700 may therefore further comprise identifying patterns marked on the entity 1, 10 corresponding to two or more of the plurality of markers 100. The location, and optionally orientation, of the entity 1, 10 may then be determined based on the multiple identified optically readable markers 100.

Figure 9:
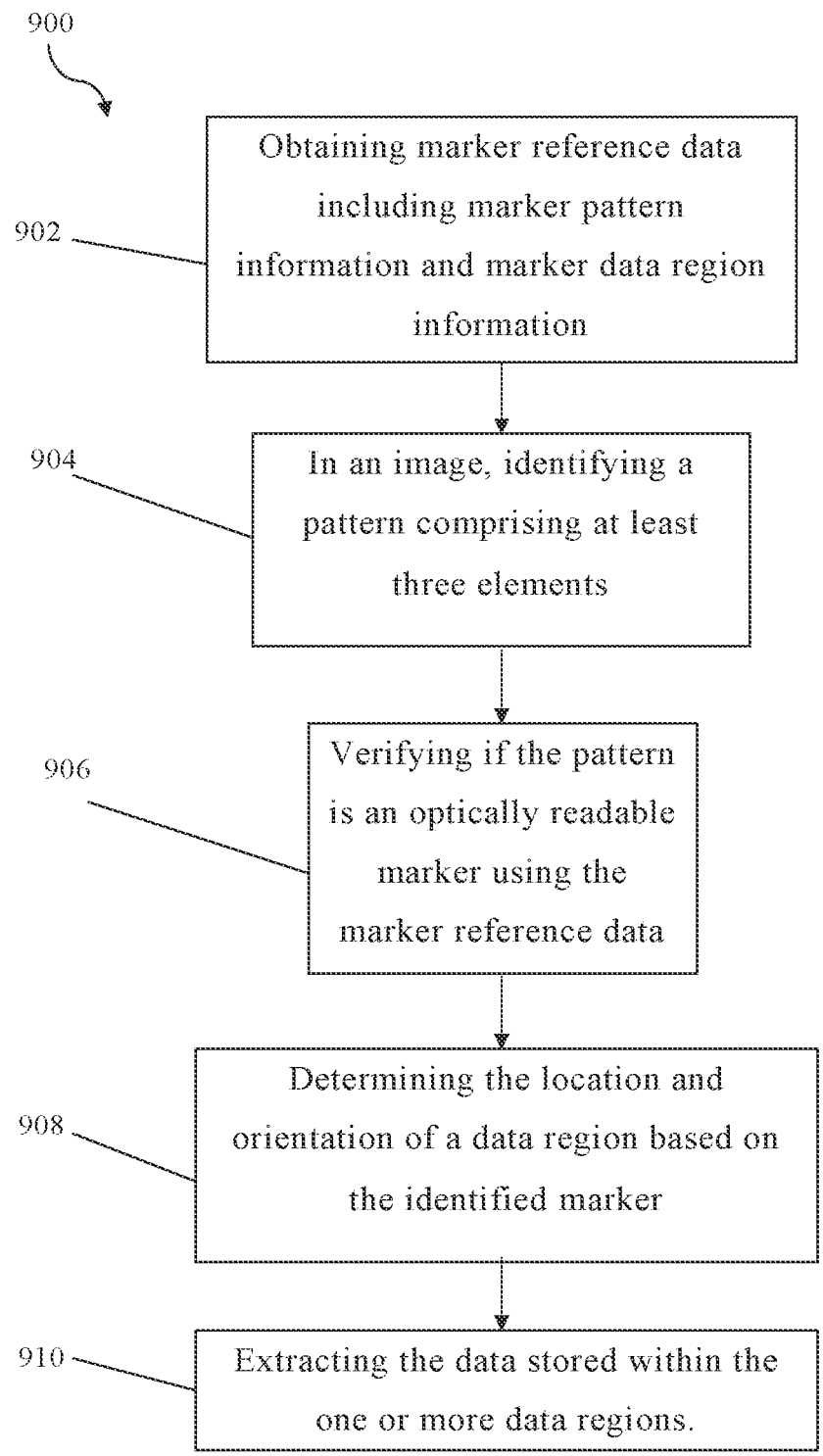
FIG. 9 illustrates a method of data extraction from a marker as described herein.

FIG. 9 illustrates a method 900 of extracting data from an image, using a marker 100 as described above. It will be appreciated that this method 900 may be used in conjunction with the method 700 of identifying the presence (and optionally also location and orientation) of an optically-readable marker 100.

The method 900 comprises obtaining 902 marker reference data, the marker reference data providing data relating to a template of an optically readable marker 100 comprising a dash and two dots and the location and orientation of one or more data regions 300 relative to the marker 100, wherein the dash 102 and dots 104, 106 are collinear, and wherein the dots are of the same size and shape and adjacent to each other. This marker reference data may be the same as that used for the method 700. For the method 900 to be performed, the marker reference data includes the location and orientation of one or more data regions 300 relative to the rest of the marker 100. This information allows data encoded into the marker 100 to be identified and read.

The method 900 comprises identifying 904 a pattern in the image, the pattern comprising at least three elements 102, 104, 106, and verifying 906 that the relative sizes and spacings of the elements 102, 104, 106 of the pattern correspond to an optically readable marker 100 defined in the marker reference data so as to identify the pattern as forming an optically readable marker 100. These steps, which may be performed simultaneously, may be the same as described above with respect to FIG. 7.

The method 900 then comprises determining 908 the location and orientation of the one or more data regions 300 based on the identified optically readable marker 100. The location and orientation may be defined in the marker reference data relative to dot 104, 106 and dash 102 sizes and spacings, rather than absolute values, as these may vary in differently-angled and distanced images. The determined orientation may not be unique in some cases.

An affine transformation as described above may be used to produce a rectified view of the data region(s) 300, and thereby of the data of interest—for example text characters that will be passed on to an Optical character recognition (OCR) algorithm. If the data region 300 is known to contain textual characters, these can be passed on to a standard OCR algorithm to extract the identity of the characters present. Alternatively or additionally, the data region 300 could contain data encoded in other forms such as a barcode; in this case the dash-dot-dot pattern 102, 104, 106 would serve the purpose of identifying the region of interest 300 and the image transformation.

The skilled person will appreciate that determining a correspondence between a reference pattern (also referred to as a template) and the dash-dot-dot pattern of a marker 100 allows a location (and in some embodiments orientation) of the data regions 300 of the marker 100 to be determined. The method 900 comprises extracting 910 the data from the one or more data regions 300. In some embodiments, the extraction 910 may comprise optically scanning the data region(s) 300 of the marker 100 after the initial image has been taken. In alternative embodiments, the extraction 910 may comprise processing the already-taken image to extract the data from the identified region(s) 300. In either case, information on angle and skew of the marker 100 (determined relative to the template) may be used to rectify the image prior to reading, and/or to adjust an algorithm used to extract the data.

At step 910, the determined location(s) of the data region(s) 300 may be scanned optically so as to extract the data. In the case of text-based (alphanumeric) data, optical character recognition may be performed at step 910. In alternative or additional embodiments, the optical scanning may comprise reading a barcode, performing image recognition, or the likes, depending on data type. The marker reference data may include an indication of data type, which may vary between markers 100 and indeed between data regions 300 of a single marker 100.

In various embodiments, the marker 100 is marked on an entity 1, 10, such as a physical article 1, 10, and the data includes information on an identity of the marked entity 1, 10.

In various embodiments, a plurality of data regions 300 are defined in the marker reference data and optically scanned so as to extract the encoded data.

In various embodiments, the marker 100 may be applied to a label or sticker, for a user to position as wished, and the label may be metallic, plastic or paper, amongst other options known in the art. In further embodiments, the marker 100 may be applied to any surface, for example a surface of an object or to a picture (e.g. a poster), or may be used in a digital image (e.g. an animation or website).

In the embodiments being described, each dot 104, 106 is at least 0.2 mm across, and optionally is between 0.2 and 15 mm or 2 and 10 mm across, and more particularly has a diameter of 3.5 mm on the controller 1 shown. For a "world marker" intended to be positioned by a user or organiser, such as the mat 10 described above, each dot 104, 106 may be larger, for example having a diameter of 10 mm. In other use cases, for example on billboards or advertising screens, dots 104, 106 may be much larger (e.g. 30 cm across), whereas for printing on beverage can ring-pulls or the like, the dimensions may be sub-millimetre. It will be appreciated that the likely size of the dots 104, 106 in an image taken of the dots should generally be considered in selecting dot size, and therefore marker size, so as to make the marker 100 identifiable in the image—likely distance of the marker 100 from a camera is therefore one factor to consider. An image of a beverage ring-pull may be taken from just a few cm away from the ring-pull, whereas an image of a billboard may be taken from street level, many metres away—marker size may therefore be varied as appropriate to the use case. A 30 cm diameter dot on a billboard is likely to be small in a photo taken of that billboard and its surroundings, for example.

Each dot 104, 106 is provided on a plain background for ease of identification. The plain background may extend for a length of at least double the dot diameter beyond the dot 106 furthest from the dash 100. The spacing between dots may be equal to, or slightly smaller than, dot diameter in some embodiments—for example being between 0.2 and 10 mm, and more particularly around 3.2 mm on the controller 1 shown (i.e. 6.7 mm from dot centre to dot centre for 3.5 mm diameter dots). The spacing between the dot 104 and the collinear dash 102 may be the same as the spacing between the dots 104, 106.

In the embodiment being described, each dot 104, 106 is positioned within a larger plain background—in this case a circular region of 9.9 mm diameter, although this may vary in other embodiments—to ensure that the dots 104, 106 are clearly distinguishable from other features of an image including the marker. In the embodiment being described, the plain backgrounds of individual dots may overlap. The plain/blank spacing $X_3$ may extend beyond the circular region in some embodiments.

In the embodiments being described, each dash 102 has a width similar to the dot size, and a length at least twice the dot size, and optionally of 2-3 times the dot size. For example, the dash 102 may have dimensions of 3.5×17.5 mm on the controller 1 and 10×20 mm on the mat 10.

In the embodiments being described, each dash 102 is positioned within a larger plain background—at least three sides of the dash 102 are bordered by a background region of a plain, contrasting, colour. All four sides of the dash 102 may be on a plain background in some embodiments, like that shown in FIG. 4. In other embodiments, such as that shown in FIG. 2, one end of the dash 102 may be in contact with a border or other image instead of a plain background. A sufficient area and/or number of vertices or edges of the dash 102 remains easily distinguished from the surroundings for identification.

The skilled person will appreciate that other dimensions may be chosen in other embodiments. The marking of an article with the marker 100 may be performed by inkjet printing, laser etching, or any other suitable technique known to one skilled in the art. In some embodiments, markers 100 may be provided in the form of stickers or clips to be attached to an object or surface. Digital markers 100 may be provided on digital images.

The invention claimed is:

1. A marker detection and position-determination system comprising:
   an optically readable marker comprising a dash and two dots arranged in a pattern to allow detection of the marker, wherein the dash and dots are collinear, and wherein the dots are of the same size and shape and adjacent to each other; and
   a processing unit arranged to:
      obtain marker reference data for the marker, the marker reference data providing data relating to a template of the marker;
      obtain a two-dimensional image showing the marker;
      identify the marker in the two-dimensional image from the relative sizes and spacings of detected elements of the marker, the elements of the marker being the dash and the dots; and
      determine the position of the marker by determining correspondences between the detected elements and the template and computing an image transformation to align the detected elements with the template.

2. The system of claim 1, wherein a distance between the dots of the marker is arranged to provide an indication of at least one of the location and the length of the dash of the marker.

3. An optically readable marker comprising:
   a dash and two dots arranged in a pattern to allow detection of the marker, wherein the dash and dots are collinear, and wherein the dots are of the same size and shape and adjacent to each other,
   and wherein the dash and two dots of the optically readable marker are arranged to allow the marker to be identified, and a position of the marker to be determined, by a processing unit using marker reference data.

4. The optically readable marker of claim 3, wherein a distance between the dots of the marker is arranged to provide an indication of at least one of the location and length of the dash of the marker.

5. The optically readable marker of claim 3, wherein the optically readable marker forms part of a composite marker, the composite marker comprising at least two such optically-readable markers in known relative positions.

6. The optically readable marker of claim 3, wherein the marker further comprises optically-extractable data, and wherein the optically-extractable data are located within at least one data region associated with the pattern of two dots and a dash, the at least one data region having a known size and position with respect to the pattern.

7. The optically readable marker of claim 3, wherein the optically readable marker is marked on an entity
   and wherein the dash and two dots of the optically readable marker are arranged to allow the position of the marked entity to be determined.

8. The optically readable marker of claim 5, wherein the composite marker comprises two non-parallel and non-collinear optically readable markers with a shared L-shape providing the dash for each marker.

9. The optically readable marker of claim 5, wherein the composite marker comprises two non-parallel and non-collinear optically readable markers, and wherein a dot is shared between the two optically readable markers.

10. The optically readable marker of claim 7, wherein the pattern of two dots and a dash is the only mark provided for detection of the presence of the marker.

11. The optically readable marker of claim 7, wherein the entity is marked with multiple optically readable markers each comprising a set of two dots and a dash.

12. The optically readable marker of claim 7, wherein the marked entity is an entity for use in
   a virtual reality or augmented reality application.

13. A computer-implemented method for identifying the presence of an optically-readable marker, the method comprising:
   obtaining marker reference data, the marker reference data providing data relating to a template for an optically readable marker comprising a dash and two dots, wherein the dash and dots are collinear, and wherein the dots are of the same size and shape and adjacent to each other;
   in an image, identifying a pattern, the pattern comprising at least three elements;
   verifying that the relative sizes and spacings of the elements of the pattern correspond to an optically readable marker defined in the marker reference data so as to identify the pattern as forming an optically readable marker.

14. The method of claim 13, further comprising identifying the location and orientation of an entity marked with the marker, wherein the marker reference data comprises information on the position of the marker on the entity and the image includes an image of at least a part of the entity including the marker, and wherein the method further comprises:
   determining the location and orientation of the entity based on the identified optically readable marker and any transformations performed to map the image of the marker to the marker template as defined in the marker reference data.

15. The method of claim 13 further comprising acquiring a two-dimensional image including the marker.

16. The method of claim 14 wherein the orientation of the entity is uniquely determined using the at least one identified optically readable marker.

17. The method of claim 14, wherein the entity is marked with a plurality of markers, and wherein the method further comprises identifying patterns marked on the entity corresponding to at least two of the plurality of markers, and determining the location and orientation of the entity based on the plurality of identified optically readable markers.

18. The method of claim 13 wherein the identifying a pattern within the image comprises:
   detecting dots within the image;

identifying a first pair of dots which have no other mark therebetween;

determining at least one expected position of a dash based on the pair of dots; and searching for the dash in the at least one expected position.

19. The method of claim 18 wherein the determining the at least one expected position of the dash comprises looking for a dash adjacent to one of the dots and collinear with the pair of dots, within an expected distance range of the dots, the distance being determined relative to at least one of the size and spacing of the dots.

20. The method of claim 13, wherein the marker reference data provides the location and orientation of at least one data region relative to the marker, and wherein the method further comprises:

determining the location and orientation of the at least one data region based on the identified optically readable marker; and extracting data from the at least one data region.

\* \* \* \* \*